(12) United States Patent
Warr et al.

(10) Patent No.: US 9,881,096 B1
(45) Date of Patent: Jan. 30, 2018

(54) WEB PAGE TAB MANAGEMENT BASED ON LOCATION

(75) Inventors: Andy Warr, San Francisco, CA (US); Nicholas Jitkoff, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 13/245,765

(22) Filed: Sep. 26, 2011

(51) Int. Cl.
  *G06F 17/00* (2006.01)
  *G06F 17/30* (2006.01)

(52) U.S. Cl.
  CPC .............. *G06F 17/30873* (2013.01)

(58) Field of Classification Search
  None
  See application file for complete search history.

(56) References Cited

U.S. PATENT DOCUMENTS

| | | | |
|---|---|---|---|
| 6,049,812 A | 4/2000 | Bertram et al. | |
| 6,359,634 B1 | 3/2002 | Cragun et al. | |
| 6,819,267 B1 * | 11/2004 | Edmark ............ | H04L 67/18 340/988 |
| 7,035,896 B1 * | 4/2006 | Schneider ............ | 709/202 |
| 7,047,499 B2 | 5/2006 | Ferri | |
| 7,426,697 B2 | 9/2008 | Holecek et al. | |
| 7,596,760 B2 | 9/2009 | Sauve et al. | |
| 7,774,366 B2 | 8/2010 | Fisher et al. | |
| 7,921,365 B2 | 4/2011 | Sauve et al. | |
| 7,921,372 B2 | 4/2011 | Sauve et al. | |
| 8,028,245 B2 | 9/2011 | Yolleck et al. | |
| 2002/0130904 A1 | 9/2002 | Becker et al. | |
| 2003/0071849 A1 | 4/2003 | Ferri | |
| 2003/0197735 A1 | 10/2003 | Woltzen | |
| 2004/0093562 A1 | 5/2004 | Diorio et al. | |
| 2004/0113948 A1 | 6/2004 | Shahrbabaki et al. | |
| 2005/0283738 A1 | 12/2005 | Beringer et al. | |
| 2006/0041830 A1 | 2/2006 | Bohn | |
| 2006/0184537 A1 | 8/2006 | Sauve et al. | |
| 2006/0206834 A1 | 9/2006 | Fisher et al. | |
| 2006/0218500 A1 * | 9/2006 | Sauve et al. ............ | 715/767 |
| 2006/0230356 A1 | 10/2006 | Sauve et al. | |
| 2006/0271861 A1 | 11/2006 | Yolleck et al. | |
| 2007/0067733 A1 | 3/2007 | Moore et al. | |
| 2007/0162864 A1 | 7/2007 | Masselle et al. | |
| 2007/0186176 A1 | 8/2007 | Godley | |
| 2008/0005686 A1 | 1/2008 | Singh | |

(Continued)

OTHER PUBLICATIONS

Hardemeier, Sandi; "Tab Groups"; Dec. 17, 2008; IE-Vista; www.ie-vista.com/tabs_groups.html; pp. 1-4.*

(Continued)

*Primary Examiner* — Asher Kells
(74) *Attorney, Agent, or Firm* — McDermott Will & Emery LLP

(57) ABSTRACT

Systems and methods for web page tab management are provided. A method for web page tab management includes determining a web browser tab group to open, in its own window of a web browser executed by a computing device, based on a location of the computing device. The determined tab group includes a plurality of tabs assigned to the browser window and corresponding to a plurality of open web pages associated with the location. The method further includes the computing device automatically opening the determined tab group in the web browser window. A system for web page tab management includes a tab group determiner and a tab group manager.

19 Claims, 5 Drawing Sheets

(56) References Cited

U.S. PATENT DOCUMENTS

| | | |
|---|---|---|
| 2008/0141162 A1 | 6/2008 | Bockus |
| 2008/0184137 A1 | 7/2008 | Grimm et al. |
| 2008/0229231 A1 | 9/2008 | Delia et al. |
| 2008/0301562 A1 | 12/2008 | Berger et al. |
| 2009/0327947 A1 | 12/2009 | Schreiner et al. |
| 2010/0031166 A1 | 2/2010 | Choudhary et al. |
| 2010/0031185 A1 | 2/2010 | Wilson et al. |
| 2010/0070928 A1 | 3/2010 | Goodger et al. |
| 2010/0115450 A1 | 5/2010 | Scott et al. |
| 2010/0115451 A1 | 5/2010 | Moore et al. |
| 2010/0318701 A1* | 12/2010 | Srinivasan ............ G06Q 10/10 710/104 |
| 2011/0047275 A1 | 2/2011 | Jones et al. |
| 2011/0087984 A1 | 4/2011 | Jitkoff et al. |
| 2011/0131523 A1 | 6/2011 | Grant et al. |
| 2011/0167376 A1 | 7/2011 | Sauve et al. |
| 2011/0179375 A1 | 7/2011 | Shupp et al. |
| 2011/0271223 A1* | 11/2011 | Cruz Moreno et al. ...... 715/777 |
| 2011/0271224 A1 | 11/2011 | Cruz Moreno et al. |
| 2011/0314407 A1 | 12/2011 | Cruz Moreno et al. |

OTHER PUBLICATIONS

Boutin, Paul; "Setting Browser Tabs to Open at Start-Up"; May 27, 2011; New York Times Gadgetwise Blog; http://gadgetwise.blogs.nytimes.com/2011/05/27/setting-browser-tabs-to-open-at-launch/.*
Mozilla, "TabAlarm::Add-ons for Firefox," https://addons.mozilla.org/en-US/firefox/addon/tabalarm/, downloads Aug. 15, 2011, 10 pages.
Daniella Nicole, "How to Move a Tab to Another Window in Firefox," http://www.ehow.com/how_4466411_move-tab-another-window-firefox.html, downloaded Aug. 15, 2011, 6 pages.

\* cited by examiner

WEB PAGE TAB MANAGEMENT BASED ON LOCATION

BACKGROUND

Technical Field

Embodiments relate generally to web browser applications.

Background

Web browsers may be used to display news and sports information, weather information, online forums (e.g., social and business networking forums, web blogs, bulletin boards, and online discussion forums), online shopping sites, and specialized and general purpose web search sites. Web browser clients support tabbed browsing. Tabbed web browsers allow a user to open multiple web pages, each page having a corresponding tab. The tabs may be arranged in a tab area of a web browser window.

Users can have separate web browser windows for different types of web activity, each window having a set of tabs related to the activity. For example, one window may be for work productivity, including tabs for work email, a work calendar and work documents. Another window may be set up for personal matters, including tabs for work email, social networking, music, news and movies. Although browsers support bookmarks, they are really not designed for grouping and restoring window and tab configurations. Many users do not like using bookmarks, which take up screen real estate and have cumbersome navigation. Also, many users have different browsing objectives at different locations.

BRIEF SUMMARY

Methods and systems for web page tab management are provided. In an embodiment, a method for web page tab management includes determining a web browser tab group to open, in a respective window of a web browser executed by a processor-based computing device, based on a location of the processor-based computing device. The determined tab group includes a plurality of tabs assigned to the browser window and corresponding to a plurality of open web pages associated with the location. The method further includes the computing device automatically opening the determined tab group in the browser window.

In another embodiment, a system for web page tab management includes a tab group determiner configured to determine a web browser tab group to open, in a respective window of a web browser executed by the processor-based device, based on a location of the processor-based computing device. The determined tab group includes a plurality of tabs assigned to the browser window and corresponding to a plurality of open web pages associated with the location. The system also includes a tab group manager configured to automatically open the determined tab group in the browser window.

In a further embodiment, a computer readable storage medium having control logic stored therein that, when executed by a processor, causes the processor to manage web page tabs. The control logic includes a first computer readable program code to cause the processor to determine a web browser tab group to open, in a respective window of a web browser executed by a computing device, based on a location of the computing device. The determined tab group includes a plurality of tabs assigned to the browser window and corresponding to a plurality of open web pages associated with the location. The control logic also includes a second computer readable program code to cause the processor to automatically open the determined tab group in the browser window.

BRIEF DESCRIPTION OF THE DRAWINGS

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

DETAILED DESCRIPTION

Embodiments relate to web page tab management. Embodiments are described herein with reference to illustrations. It should be understood that the invention is not limited to the embodiments. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

For example, in the embodiments described below, the client applications are Hypertext Markup Language (HTML) compatible tabbed browsers. The use of such browsers is exemplary, and other clients or applications that are capable of displaying tabbed windows providing access to multiple server applications or functions can be used.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

Figure 1:
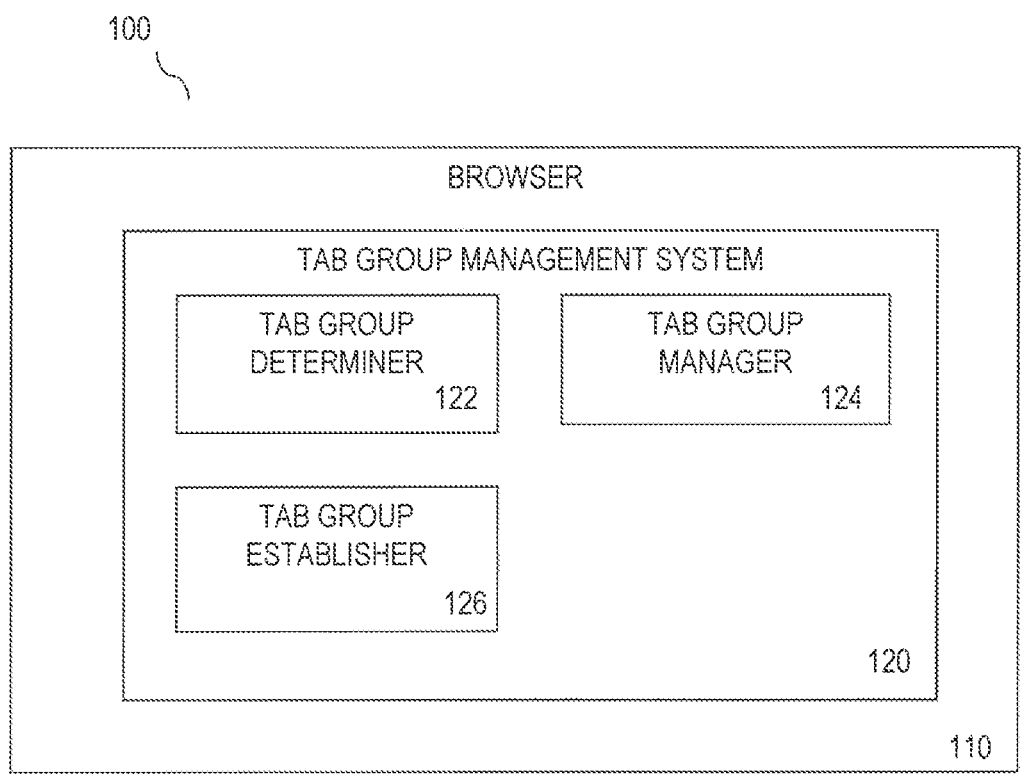
FIG. 1 is a diagram of a system for web page tab management, according to an embodiment.

FIG. 1 is a diagram of a system 100 for web page tab management, according to an embodiment. Exemplary system 100 includes web browser 110 executed by a computing device. The computing device may be configured to execute instructions and to carry out operations associated with system 100. In an embodiment, the computing device can be implemented on a single computing device such as, for example and without limitation, a mobile device. The computing device can be based on processing devices that include, but are not limited to, programmable logic arrays, application-specific integrated circuits, and central processing units that have at least one processor and memory. In another embodiment, computing device can have multiple processors and multiple shared or separate memory components such as, for example and without limitation, one or more computing devices incorporated in a clustered computing environment or a server farm. The computing process can be performed by the clustered computing environment, or server farm, and may be carried out across multiple processors located at the same or different locations.

The computing device may include a display device for presenting text and graphical information. The display device can be, for example and without limitation, a liquid crystal display, a plasma display, a computer monitor (e.g., a variable graphics array (VGA) display, a super VGA display, and a cathode ray tube display), and other similar types of display devices. In an embodiment, the display device can be configured to display a graphical user interface (GUI) that provides an interface between a user and the computing device or an application running on the computing device (also referred to herein as a "system application"). The system application can be, for example and without limitation, an email application, a multi-media display application, a document generating application, or a video game. Features of the GUI for the system application can be arranged in a predefined layout on the display device or can be generated dynamically to serve specific actions taken by the user, according to an embodiment. For instance, the GUI can display information such as interactive text and graphics for the user to select via an input device.

The computing device can be, for example, and without limitation, a personal computer system (e.g., desktop, laptop, tablet, and handheld computers), a personal digital assistant (PDA), mobile device, navigation device or a smart phone. The computing device can be configured to access content hosted on web servers over a network using browser 110. The network can be any network or combination of networks that can carry data communications. Such a network can include, but is not limited to, a wired (e.g., Ethernet) or a wireless (e.g., Wi-Fi and 3G) network. In addition, the network can include, but is not limited to, a local area network, medium area network, and/or wide area network such as the Internet. The network can support protocols and technology including, but not limited to, Internet or World Wide Web protocols and/or services. Intermediate network routers, gateways, or servers may be provided between servers and clients depending upon a particular application or environment.

Browser 110 may exist within or be executed by hardware in a computing device. For example, browser 110 may be software, firmware, or hardware or any combination thereof in the computing device. Browser 110 may include window areas for displaying visual content in a window from one or more selected web based applications, and tab areas for displaying tabs associated with open browser windows associated with web based applications. A user can select a window from a set of open windows for viewing in a window area by selecting a tab, associated with the window and displayed in a tab area, using an input device connected to or a touch screen on the computing device. For example, a user might use a pointing device connected to the computing device to select a particular tab, and in response to the selection, browser 110 may be configured to display the contents of a window associated with the selected tab in the window. Tab management system 120 may be executed by or in coordination with browser 110.

Figure 2A:
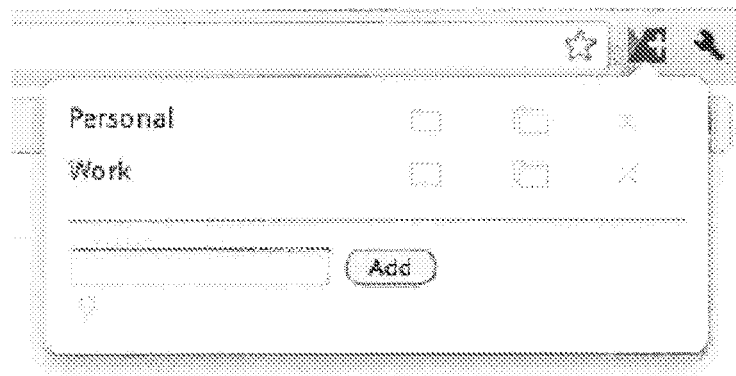
FIGS. 2A-2B show display views of an example embodiment of the system for web page tab management.
Figure 2B:
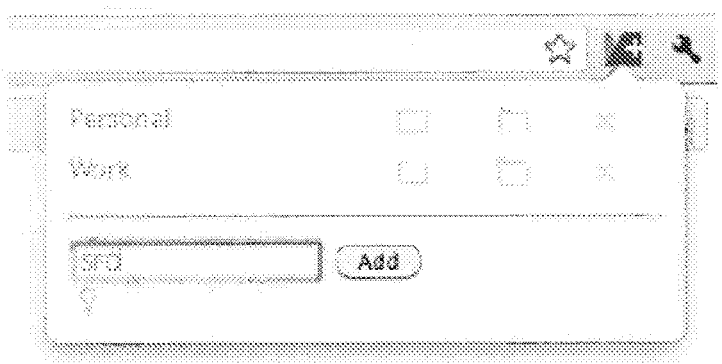

According to an embodiment, tab management system 120 includes tab group determiner 122 and tab group manager 124. Tab management system 120 may also include tab group establisher 126. Established tab groups may be shown by the display view of FIG. 2A. Tab group establisher 126 may be configured to create tab groups, as shown in the display view of FIG. 2B. Tab group establisher 126 may enable users to, for example, click on an extension icon. To create a tab group for the tabs in the current window, a user types in the desired name of the tab group and clicks the 'Add' button. Tab groups may also be created based on other factors, such as location, time, activity triggers or user patterns.

Tab groups will automatically open in a window based on the established location. Tab groups may automatically open in the current browser window. Tab groups may also open in a new window. Tab groups may also be removed. In some cases, a user may open all tab groups, or replace tab groups. Selected tab groups may be brought into focus or into a prominent position if already open.

According to an embodiment, tab group determiner 122 is configured to determine a web browser tab group to open. The tab group is determined based a location of the processor-based computing device executing the web browser. Time and user preferences may also be factors. The determined tab group includes a plurality of tabs assigned to the browser window and corresponding to a plurality of open web pages associated with the location.

The location may be a work location, perhaps a specific office or conference room. It may be a specific location within a room. The location may be a home computer in the family room or in a home office. The location may be on the bus, in a taxi, a car seat, an airplane, a café, a park, a friend's apartment, the grandparents' house or other typical location. One tab group may be determined for a friend's apartment and another for a work office.

Tab group manager 124 is configured to automatically open the determined tab group in the web browser window. The tab group will be opened in its own window of a web browser.

Figure 3A:
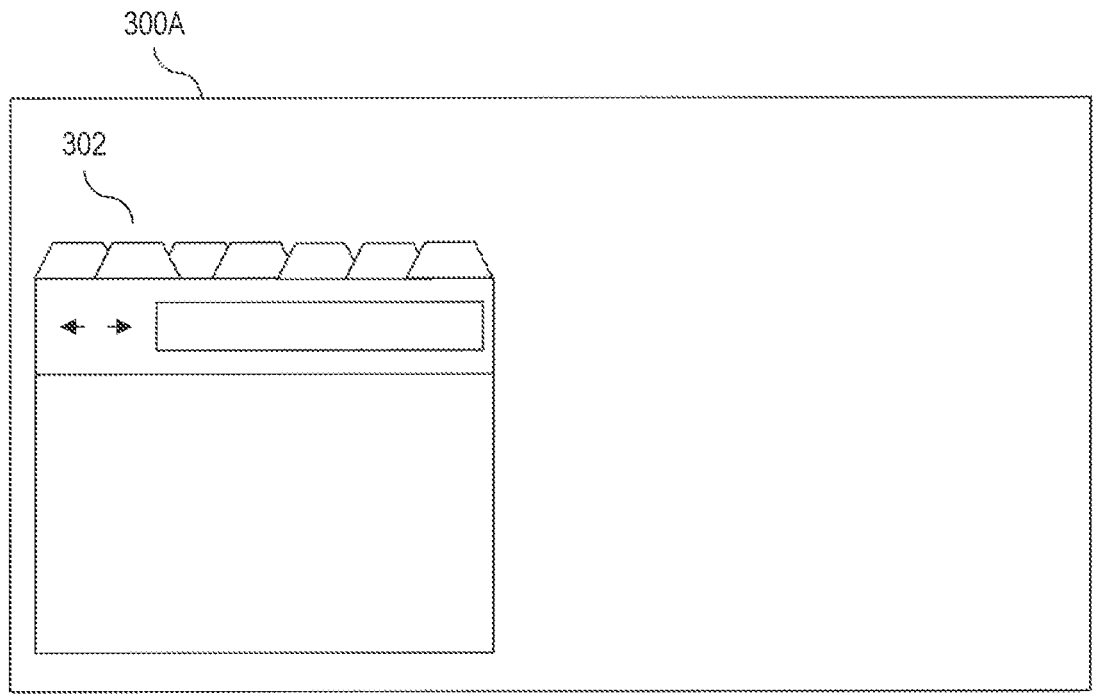
FIGS. 3A-3B show display views of an example embodiment of the system for web page tab management.
Figure 3B:
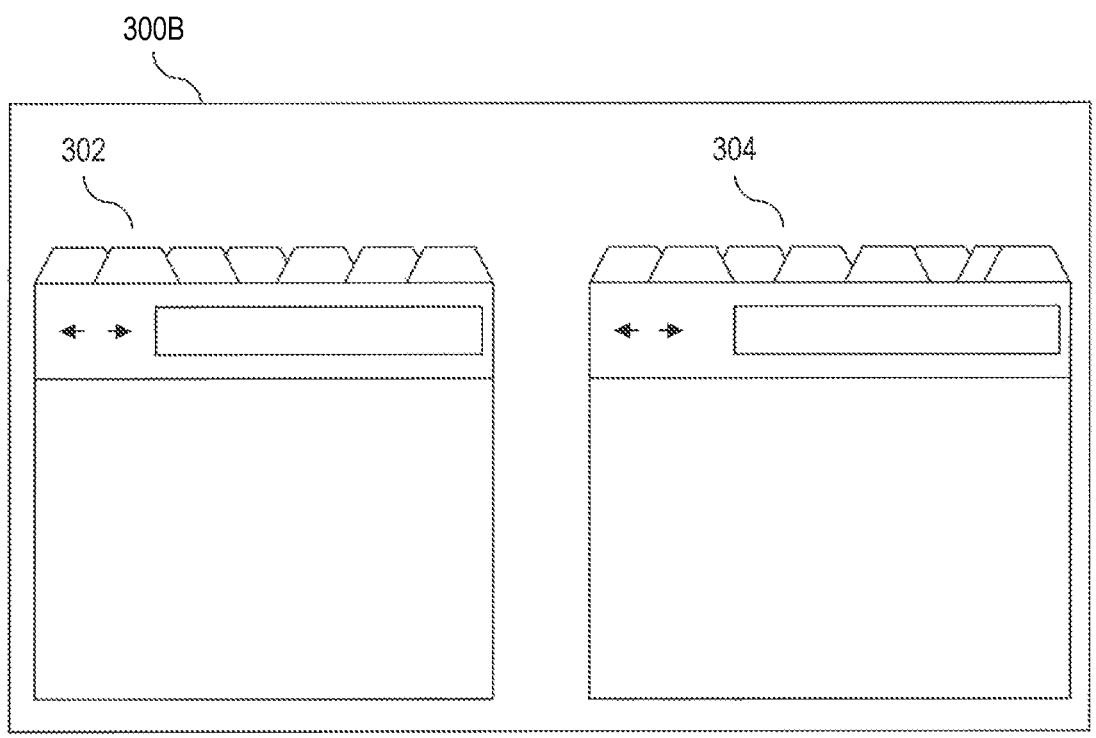

An example scenario is provided. A class of students enters a classroom and the teacher asks the class to take a seat and open the class website. The students sit down and open their computers. A window automatically opens with the class tab group. An example display 300A of this tab group 302 is shown in FIG. 3A. The student later moves to another classroom. Tab group 304 of display view 300B automatically opens. Tab group 304 corresponds to the subject matter of the course taught in this second classroom.

Figure 4A:
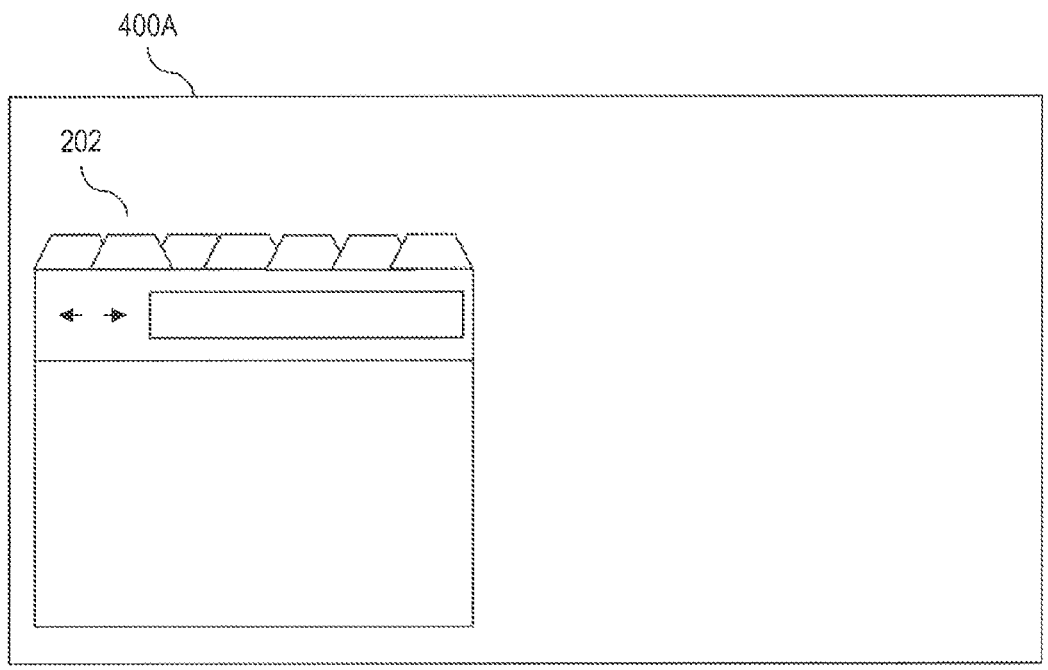
FIGS. 4A-4B show display views of an example embodiment of the system for web page tab management.
Figure 4B:
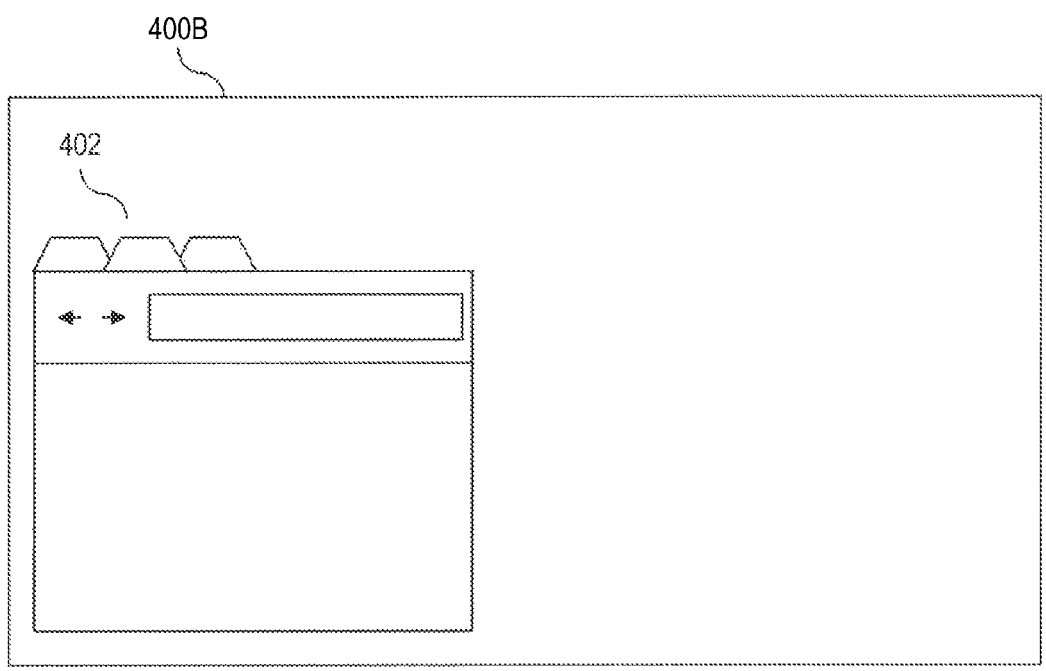

If a tab group replaces a browser window with tabs that are currently open, tabs are replaced. Extra tabs are removed. Tabs are added as needed. FIGS. 4A and 4B show tab group 202 in display view 400A. Based on a new location, tab group 202 is replaced by tab group 402 in display view 400B. Tab group 402 has fewer tabs than tab group 202. Extra tabs, beyond those replaced by new tabs, are removed.

In another example scenario, a worker arrives at his or her office with a laptop. A work tab group, including tabs for work email and a work calendar, opens based on the office location. The worker attends another meeting in a conference room. Another tab group corresponding to the meeting automatically opens based on the time and location of the meeting. Later that day, the worker brings his or her laptop to a friend's apartment. A personal tab group, including tabs for music, social networking and web search automatically opens. Tabs set to be pinned will be pinned based on information associated with the tab group. It is not necessary to locate bookmarks and make multiple navigations. The tab groups are opened based on a location of the user. The tab groups may also be opened based on time.

According to an embodiment, when a user creates a tab group, he or she can select the pin icon to indicate that the tab group automatically open when in that location (i.e., hotspot). In some cases, hot spot sizes may be defined. The next time the user enters the hotspot, if the tab group is not already open, the tab group opens in a new window. In one embodiment, no typing, clicking, navigation, bookmark hunting is performed. This feature may also be disabled for certain locations or types of locations. Tab groups may also open and close based on travel within a building or outside when near different locations.

In another embodiment, new tab groups may be created based on a future or selected location. This selection may be used in combination with geographical information system (GIS) maps or GPS software. Also, additional locations may be added for a single tab group. In a further embodiment, different icons may be used to identify location-based tab groups or which tab groups will open in a hotspot.

In another embodiment, tab groups may close or be replaced when entering, leaving or moving to specified locations. Tab groups may also be affirmatively opened by the user. Location may combine with time in determining tab group activity.

Figure 5:
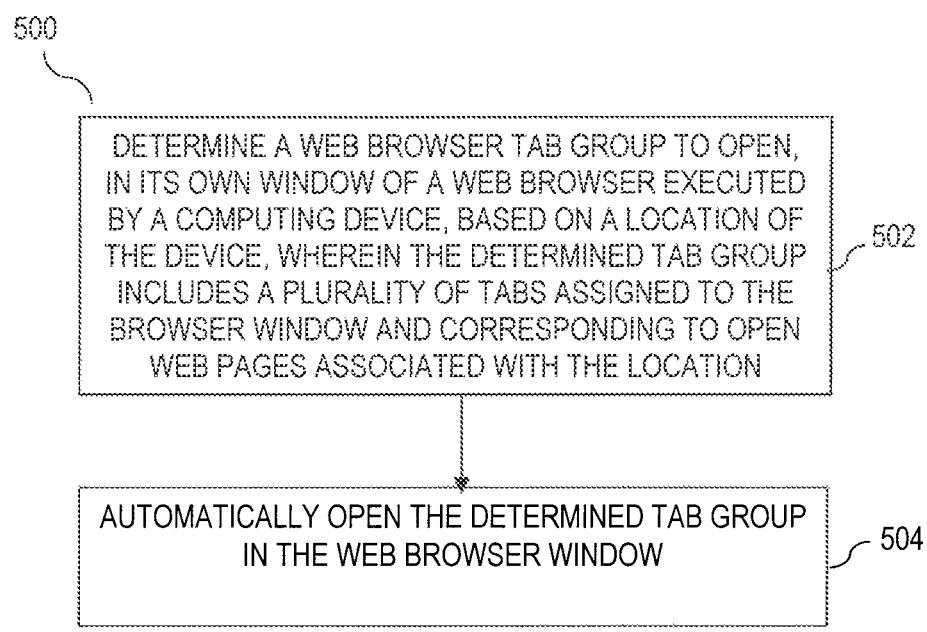
FIG. 5 illustrates a flowchart of a method for web page tab management according to an embodiment.

FIG. 5 is a flow chart illustrating an exemplary method 500 of an embodiment. Method 500 begins in step 502 with determining a web browser tab group to open based on a location of the processor-based computing device. The tab group will be opened in its own window of a web browser executed by a processor-based computing device. The determined tab group includes a plurality of tabs assigned to the browser window and corresponding to a plurality of open web pages associated with the location. Step 502 may be performed by tab group determiner 122.

At step 504, the determined tab group is automatically opened, by the processor-based device, in the web browser window. Tab group 504 may be performed by tab group manager 124.

Embodiments may be directed to a computer readable storage medium comprising software stored on any computer usable medium. Such software, when executed in one or more data processing devices, causes a data processing device(s) to operate as described herein. Embodiments employ any computer usable or readable medium. Examples of non-transitory computer readable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.). Additional computer readable medium can include communication mediums (e.g., wired and wireless communications networks, local area networks, wide area networks, intranets, etc.).

As would be understood by a person skilled in the art based on the teachings herein, several variations of the above described features of systems and methods for managing browser tab windows can be envisioned. These variations are within the scope of embodiments.

The Summary and Abstract sections may set forth one or more but not all exemplary embodiments as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method comprising:
receiving, by a processor-based computing device, web page tab selections to be assigned to a web browser tab group associated with a location;
establishing, by the processor-based computing device, the web browser tab group based on the web page tab selections and the location, wherein each of the web page tab selections in the web browser tab group is related to an activity corresponding to the location;
establishing another web browser tab group with other web page tab selections and another location;
determining, by the processor-based computing device, a current location of the processor-based computing device after establishing the web browser tab group;
automatically opening, by the processor-based computing device and without user input, a window of a web browser that includes the web browser tab group when the processor-based computing device determines that the current location of the processor-based computing device is the location associated with the web browser tab group;
determining a change in the current location of the processor-based computing device to the another location;
automatically closing or replacing, by the processor-based computing device and without user input, at least one displayed tab of the web browser tab group when the processor-based computing device leaves the location associated with the web browser tab group; and
automatically replacing the web browser tab group displayed in the window of the web browser with a display of the another web browser tab group in the window of the web browser responsive to determining the change in the current location of the processor-based computing device to the another location and irrespective of a number of tabs in the web browser tab group.

2. The method of claim 1, further comprising:
pinning tabs of the web browser tab group based on stored pinned tab information associated with the web browser tab group, the stored pinned tab information having been stored prior to opening the window of the web browser that includes the web browser tab group and the stored pinned tab information being based on information associated with the web browser tab group.

3. The method of claim 1, further comprising:
determining the current location of the processor-based computing device based at least in part on information from a web browser geo-location navigator object.

4. The method of claim 1, further comprising:
determining the current location of the processor-based computing device based at least in part on information from a global positioning system (GPS) device.

5. The method of claim 1, wherein the window of the web browser comprises a new window of the web browser.

6. The method of claim 1, further comprising:
storing information associated with the web page tab selections and the location associated with the web browser tab group.

7. The method of claim 1, wherein the web browser tab group is further associated with a time of day and automatically opening, by the processor-based computing device and without user input, the window of the web browser that includes the web browser tab group responsive to determining that the processor-based computing device is in the location associated with the web browser tab group further comprises automatically opening, by the processor-based computing device and without user input, the window of the web browser that includes the web browser tab group responsive to determining that both the processor-based computing device is in the location associated with the web browser tab group and that a current time of day equals the time of day associated with the web browser tab group.

8. The method of claim 1, wherein each tab of the web browser tab group is contemporaneously displayed in the window of the web browser when the window of the web browser that includes the web browser tab group is automatically opened.

9. The method of claim 1, wherein automatically closing or replacing, by the processor-based computing device and without user input, the at least one tab of the web browser tab group when the processor-based computing device leaves the location associated with the web browser tab group further comprises automatically closing, by the processor-based computing device and without user input the window of the web browser.

10. A system comprising:
at least one processor configured to:
receive tab selections to be assigned to a tab group associated with a location;
establish the tab group based on the tab selections and the location, wherein the tab group is related to an activity corresponding to the location;
automatically open and display the tab group in a window when the system enters the location associated with the tab group;
determine a change in the location of the system; and
automatically close the display of the tab group when the system leaves the location associated with the tab group and automatically replace an entirety of the tab group with a new tab group responsive to determining the change in the location of the system irrespective of both a number of tabs in the tab group and a number of tabs in the new tab group.

11. The system of claim 10, wherein the at least one processor is further configured to pin tabs of the tab group based on stored pinned tab information associated with the tab group, the stored pinned tab information having been stored prior to opening the tab group in the window.

12. The system of claim 10, wherein the tab group is further associated with a time of day and the at least one processor is further configured to:
automatically open the tab group in the window when the system is in the location associated with the tab group and a current time of day equals the time of day associated with the tab group.

13. The system of claim 10, wherein the at least one processor is further configured to determine a location of the system using information from a web browser geo-location navigator object.

14. The system of claim 10, wherein the at least one processor is further configured to determine a location of the system using information from a global positioning system (GPS) device.

15. The system of claim 10, wherein the window comprises existing tabs of an existing tab group.

16. The system of claim 15, wherein the at least one processor is further configured to:
replace an entirety of the existing tab group with tabs of the tab group, irrespective of a number of the existing tabs in the existing tab group.

17. The system of claim 15, wherein the at least one processor is further configured to:
remove excess tabs when a number of the existing tabs in the existing tab group is greater than a number of tabs of the tab group and add tabs when the number of the existing tabs in the existing tab group is less than the number of the tabs of the tab group.

18. The system of claim 10, wherein the at least one processor is further configured to:
store information associated with the tab selections and location of the tab group.

19. A computer program product comprising instructions stored in a non-transitory computer-readable storage medium, the instructions comprising:
instructions to receive tab selections and a time of day associated with a tab group;
instructions to establish the tab group based on the tab selections and the time of day, wherein the tab group is related to an activity corresponding to the time of day; and
instructions to automatically open and display the tab group in a window responsive to determining that a current time of day equals the time of day associated with the tab group, wherein any existing tabs displayed in the window are replaced with the display of the tab group irrespective a number of the existing tabs displayed.

* * * * *